United States Patent [19]

Zampini

[11] Patent Number: 4,701,186

[45] Date of Patent: Oct. 20, 1987

[54] POLYMERIC MEMBRANES WITH AMMONIUM SALTS

[75] Inventor: Anthony Zampini, St. Louis, Mo.

[73] Assignee: Monsanto Company, St. Louis, Mo.

[21] Appl. No.: 509,637

[22] Filed: Jun. 30, 1983

[51] Int. Cl.$^4$ ............................................. B01D 53/22
[52] U.S. Cl. ........................................ 55/158; 55/16; 55/68
[58] Field of Search ............................ 55/16, 68, 158; 210/500.2

[56] References Cited

U.S. PATENT DOCUMENTS

| | | | |
|---|---|---|---|
| 3,226,361 | 12/1965 | Borman | 260/47 |
| 3,334,069 | 7/1967 | Borman | 260/47 |
| 3,350,844 | 11/1967 | Robb | 55/16 |
| 3,378,505 | 4/1968 | Hay | 260/2.1 |
| 3,616,607 | 11/1971 | Klass et al. | 55/16 |
| 3,657,113 | 4/1972 | Stancell et al. | 55/16 X |
| 3,709,774 | 1/1973 | Kimura | 55/16 X |
| 3,735,559 | 5/1973 | Salemme | 55/16 |
| 3,762,136 | 10/1973 | Kimura | 55/158 |
| 3,775,308 | 11/1973 | Yasuda | 210/500.2 X |
| 3,852,388 | 12/1974 | Kimura | 55/16 X |
| 3,957,504 | 5/1976 | Ho et al. | 55/158 X |
| 3,980,456 | 9/1976 | Browall | 55/158 |
| 4,200,726 | 4/1980 | Ishii et al. | 210/500.2 X |
| 4,230,463 | 10/1980 | Henis et al. | 55/16 |
| 4,262,041 | 4/1981 | Eguchi et al. | 210/500.2 X |
| 4,318,714 | 3/1982 | Kimura et al. | 55/16 |

FOREIGN PATENT DOCUMENTS 0031730  7/1981  European Pat. Off.

OTHER PUBLICATIONS

Hwang et al., Techniques of Chemistry, vol. VII, Membranes in Separations, Chapter 12, John Wiley & Sons, 1975.

*Primary Examiner*—Robert Spitzer
*Attorney, Agent, or Firm*—Henry Croskell

[57] ABSTRACT

Asymmetric polymeric gas separation membranes have ammonium salts bonded to the polymer to provide a membrane with enhanced separation factor.

6 Claims, No Drawings

POLYMERIC MEMBRANES WITH AMMONIUM SALTS

BACKGROUND OF THE INVENTION

This invention relates to asymmetric polymeric membranes having ammonium salts bonded to the polymer and to processes utilizing such membranes for selectively separating at least one gas from a gaseous mixture by permeation.

The separating, including upgrading of the concentration of, at least one selective gas from a gaseous mixture is an especially important procedure in view of the demands on the supplies of chemical feedstocks. Frequently these demands are met by separating one or more desired gases from gaseous mixtures and utilizing the gaseous products for processing. Applications have been made employing separation membranes for selectively separating one or more gases from gaseous mixtures. To achieve selective separation the membrane exhibits less resistance to transport of one or more gases than of at least one other gas of the mixture. Thus, selective separation can provide preferential depletion or concentration of one or more desired gases in the mixture with respect to at least one other gas and therefore provide a product having a different proportion of the one or more desired gases to the at least one other gas than the proportion in the mixture. However, in order for selective separation of the one or more desired gases by the use of separation membranes to be commercially attractive, the membranes must satisfy several criteria so that the use of the separation procedure is economically attractive. For instance the membranes must be capable of withstanding the conditions to which they may be subjected during the separation operation. The membranes also must provide an adequately selective separation of one or more desired gases at a sufficiently high flux, that is, permeation rate of the permeate gas per unit surface area. Thus, separation membranes which exhibit adequately high selective separation but undesirably low fluxes, may require such large separating membrane surface area that the use of these membranes is not economically feasible. Similarly separation membranes which exhibit a high flux but low selective separation are also commercially unattractive. Furthermore membranes which are not capable of maintaining the desired high flux and selective separation over extended periods of time in adverse operating environments are likewise economically not feasible. Adverse environmental conditions include extremes of temperature, pressure and concentrations of chemical contaminants. Accordingly, work has continued to develop gas separation membranes which can provide both an adequately selective separation of one or more desired gases at a sufficiently high flux for an extended period of time under adverse environmental conditions such that the use of these gas separation membranes is economically feasible.

In general, the passage of a gas through a membrane may proceed through pores, i.e., continuous channels for fluid flow in communication with both feed and exit surfaces of the membrane (which pores may or may not be suitable for separation by Knudsen flow or diffusion); in another mechanism, in accordance with current views of membrane theory the passage of a gas through the membrane may be by interaction of the gas with the material of the membrane. In this latter postulated mechanism, the permeability of a gas through a membrane is believed to involve the solubility of the gas in the membrane material and the diffusion of the gas through the membrane. The permeability constant for a single gas is presently viewed as being the product of the solubility and diffusivity of that gas in the membrane. A given membrane material has a particular permeability constant for passage of a given gas by the interaction of the gas with the material of the membrane. The rate of permeation of the gas, i.e., flux, through the membrane is related to the permeability constant, but is also influenced by variables such as the membrane thickness, the physical nature of the membrane, the partial pressure differential of the permeate gas across the membrane, the temperature and the like.

It has been generally observed that materials which exhibit good separation of gases often have lower permeability constants compared to those of materials exhibiting poor separation of gases. In general, efforts have been directed to providing the material of a gas separation membrane in as thin a form as possible, in view of the low permeabilities, in order to provide adequate flux yet provide a membrane as pore-free as possible, such that gases are passed through the membrane by interaction with the material of the membrane. One approach to developing separation membranes suitable for gaseous systems has been to provide composite membranes having a superimposed membrane supported on an anisotropic porous support wherein the superimposed membrane provides the desired separation, i.e., the superimposed membrane is semi-permeable. The superimposed membranes are advantageously sufficiently thin, i.e., ultrathin, to provide reasonable fluxes. The essential function of the porous support is to support and protect the superimposed membrane without harming the delicate, thin superimposed membrane. Suitable supports are desirably porous to provide low resistance to permeate passage after the superimposed membrane has performed its function of selectively separating the permeate from the feed mixture. Klass et. al., U.S. Pat. No. 3,616,607; Stancell et. al., U.S. Pat. No. 3,657,113; Yasuda, U.S. Pat. No. 3,775,303; and Browall, U.S. Pat. No. 3,980,456 exemplify gas separation membranes having superimposed membranes on a porous support.

Such composite membranes for gas separations have not been without problems. For instance, Browall discloses that in the fabrication of composite membranes of ultrathin films fine particles (i.e., particles below about 3000 Angstroms in size) may be deposited under or between preformed ultrathin membrane layers and, because of their large size in comparison to the ultrathin membranes, puncture the ultrathin membranes. Such breaches reduce the effectiveness of the membrane. The Browall patent discloses applying a preformed organopolysiloxane-polycarbonate copolymer sealing material over the ultrathin membrane to cover the breaches caused by the fine particles. Browall also discloses employing a preformed layer of the organopolysiloxane-polycarbonate copolymer between the ultrathin membrane and the porous polycarbonate support as an adhesive. Thus the composite membranes of Browall are complex in materials and techniques of construction.

A major improvement in gas separation membranes is disclosed by Henis et. al. in U.S. Pat. No. 4,230,463 which pertains to particular multicomponent membranes for gas separations comprising a coating in contact with a porous separation membrane wherein the separation properties of the multicomponent membranes are principally determined by the porous separation membrane as opposed to the material of the coating. Such multicomponent membranes for the separation of at least one gas from a gaseous mixture can exhibit a desirable selectivity and still exhibit a useful flux. Moreover, such multicomponent membranes for gas separation can be fabricated from a wide variety of gas separation membrane materials allowing great latitude in selecting such a membrane material which is advantageous for a given gas separation. The desired combinations of flux and selectivity of separation can be provided by the configuration and methods of preparation and combination of the components. For instance, a material having high selectivity of separation, but a relatively low permeability constant, can be utilized to provide multicomponent membranes having desirable permeation rates and desirable selectivity of separation.

Despite such advances in gas separation membranes it would be advantageous to construct any membrane, including such multicomponent membranes, from materials that have normally high flux and the desired selectivity of separation but also have stable environmental resistance. That is, the membranes should have high structural strength, toughness, abrasion and chemical resistance to remain functional under extremes of pressure and differential pressure. In this regard such membranes are often required to operate with pressure differentials across the membrane of at least 2000 to 3500 Kilo Pascals (kPa) or higher, for instance up to 14,000 kPa or even higher. Depending on the operating environment chemical resistance is also desirable for instance resistance to hydrocarbons, ammonia, water and acid gases such as carbon dioxide and hydrogen sulfide is often required. Such chemicals may have a tendency to dissolve or plasticize the material of gas separation membranes resulting in deterioration of the membrane or densification of an otherwise asymmetric structure.

Polyarylene oxides have been recognized as material of some potential in the membrane separation field. For instance, Robb in U.S. Pat. No. 3,350,844 disclosed that polyarylene oxide membranes, for instance membranes of 2,6-dimethylphenylene oxide membranes, have unique properties such as a high separation factor and flux together with strength and ability to form thin films. Robb further discloses that factors such as temperature, pressure, elongation of oriented membrane material, the amount of crystallinity, among others, in the polyarylene oxide resin, may effect permeability. In this regard polyphenylene oxide resins have a low resistance to most common organic solvents. Aromatic and chlorinated hydrocarbon solvents dissolve polyphenylene oxide polymers, while other solvents and solvent vapors induce crazing in molded polyphenylene oxide parts under stress thus causing almost complete loss of strength.

See also Kimura, U.S. Pat. Nos. 3,709,774; 3,762,136; and 3,852,388 which relate to membranes of polyxylene oxide with the same apparent disadvantages.

An alternative form of polyarylene oxide membranes is disclosed by Salemme in U.S. Pat. No. 3,735,559 where various ionic forms of a sulfonated polyxylylene membrane are disclosed. Among the disadvantages discussed are that it is necessary to preshrink such membranes to avoid rupturing; the hydrogen ion form is unstable and may undergo sulfone formation resulting in cross-linking or may, in the presence of water, undergo hydrolysis with the liberation of sulfuric acid; various counter ion salt forms of the membrane are stable and will avoid detrimental cross-linking but such membranes may densify in the presence of water.

Kimura et. al., in U.S. Pat. No. 4,318,714, disclose the use of ion-exchange membranes having specific counter-ions electrostatically retained therein in gas permeation where the permeation of certain gases, such as carbon dioxide, are enhanced.

Zampini and Malon in U.S. Pat. No. 4,530,703 disclose a major improvement in polyarylene oxide membranes for gas separations which exhibit sufficient flux and selectivity of separation for general commercial operations in the presence of adverse environmental conditions as the presence of chemical contaminants, extremes of differential pressure and temperature.

Zampini and Malon in U.S. Pat. No. 4,472,175 disclose the treatment of flat or porous hollow fiber asymmetric polymeric gas separation membranes with Bronsted-Lowry acids as a productive and simple route to uncoated gas separation membranes having desirable separation properties of commercial utility levels.

Research efforts continue in the field of gas separation membrane technology to reach substantially improved economic gas separation performance utilizing asymmetric membranes of materials which have intrinsically high separation selectivity for gases such as hydrogen, carbon dioxide and the like. Attempts to improve performance by eliminating surface porosity in the materials of these membranes in an asymmetric state by using either spinning or post treatment techniques have generally resulted in membranes, particularly hollow fiber membranes, that have poor performance gas separations either in low flux or low selectivities or both. What has been discovered is that polymeric membranes of materials such as polyphenylene oxides, substituted polyphenylene oxides, polyimides, polyamides, polysulfones, polyethersulfones, cellulose esters, and the like, including cross-linked polymers, provided with ammonium salts exhibit superior gas separation properties as compared to other membranes of such material.

SUMMARY OF THE INVENTION

The present invention provides asymmetric polymeric membranes having ammonium salts bonded to the polymer. Such asymmetric membranes have a porous support and a thin dense layer. The ammonium salts are bonded to the polymer essentially at said layer of said membranes, wherein said ammonium salts enhance the separation factor of said membranes.

DEFINITION OF TERMS

In the description of the present invention the following definitions are used.

The term "cross-linked polymer" as used in this application means that polymer chains of polyarylene oxide are bonded to one and another. The fact that the polymer is stable, that is, does not dissolve in solvents for polyarylene oxide, is indicative of cross-linking.

The term "covalently bonded" as used in this application means that the cross-linkage of polymer chains is effected by chemical bonding of atoms which share electrons. Covalent bonds may range from non-polar, involving electrons evenly shared by two atoms, to extremely polar, where the bonding electrons are very unevenly shared. Covalent bonds are not intended to mean that chemical bonding where the uneven sharing is such that the bonding electrons spend substantially full time with one of the atoms as in ionic bonding.

The term "membrane" as used in this application refers to material having surfaces which can be contacted with a fluid mixture such that one fluid of the mixture selectively permeates through the material. Such membrane can generally be disposed in film- or hollow fiber-form. Membranes can be porous, or essentially pore-free, or have layers that are porous and layers that are essentially pore-free. This invention provides membranes exhibiting advantageous gas separation properties. However the membranes of this invention will exhibit useful and advantageous liquid separation properties depending on the morphology of the membrane.

The term "dense", or "dense film", membranes as used in this application means membranes which are essentially free of pores, i.e., fluid channels communicating between surfaces of the membrane, and are essentially free of voids, i.e., regions within the thickness of the membrane which do not contain the material of the membrane. Since a dense membrane is essentially the same throughout the structure, it falls within the definition of isotropic membranes. Although some of these dense membranes are fairly selective, one of their disadvantages is low permeate flux due to the relatively large thickness associated with the membranes. Dense membranes are useful in determining intrinsic gas separation properties of a material. Intrinsic separation properties include separation factor, $\alpha$, and permeability constant, P, both of which are defined below.

The term "asymmetric" or "anisotropic" membranes as used in this application means membranes which have a variable porosity across the thickness of the membrane. Exemplary of an asymmetric membrane is what is called a Loeb membrane, which is composed of two distinct regions made of the same material—a thin dense layer and a less dense, void porous support region.

The membranes of this invention comprise materials in film- or hollow fiber-form which have particular relationships. Some of these relationships can conveniently be stated in terms of relative separation factors with respect to a pair of gases for the membranes which may, optionally, have coatings. A separation factor ($\alpha a/b$) for a membrane for a given pair of gases a and b is defined as the ratio of the permeability constant ($P_a$) of the membrane for a gas a to the permeability constant ($P_b$) of the membrane for gas b. A separation factor is also equal to the ratio of the permeability $(P/l)_a$ of a membrane of thickness l for gas a of a gas mixture to the permeability of the same membrane to gas b, $(P/l)_b$. The permeability for a given gas is the volume of gas at standard temperature and pressure (STP), which passes through a membrane per square centimeter of surface area, per second, for a partial pressure drop of 1 centimeter of mercury across the membrane per unit of thickness, and is expressed in units of $cm^3/cm^2$-sec-cmHg.

In practice, the separation factor with respect to a given pair of gases for a given membrane can be determined employing numerous techniques which provide sufficient information for calculation of permeability constants or permeabilities for each of the pair of gases. Several of the many techniques available for determining permeability constants, permeabilities, and separation factors is disclosed by Hwang et. al., *Techniques of Chemistry*, Volume VII, *Membranes in Separations*, John Wiley & Sons, 1975 (herein incorporated by reference) at Chapter 12, pages 296 to 322.

Unless otherwise noted, all permeabilities are reported herein at standard temperatures and pressures of 15.6° C. and 100 kPa, respectively. The permeabilities are reported in gas permeation units (GPU), for example, fibers $cm^3(STP)/cm^2$-sec-cmHg $\times 10^6$; and films $cm^2(STP)$-cm/$cm^2$-sec-cmHg $\times 10^{10}$.

DESCRIPTION OF PREFERRED EMBODIMENTS

This invention provides asymmetric polymeric gas separation membranes having a porous support and a thin dense layer. These membranes have ammonium salts bonded to the polymer to enhance the separation factor of the membrane. Desirably the ammonium salts are at the surface of the membrane, for instance on the thin dense layer.

The presence of ammonium salts in the polymer of the membrane greatly enhances the separation factor of the membrane for certain gases. At the same time the permeabilities of the membranes for most gases decrease significantly. The changes in separation factors and permeabilities is dependent to a degree on the level of ammonium salts in the polymer and the depth to which ammonium salts are present within the thickness of the polymer. In this regard it is often desirable that ammonium salts be present essentially at the thin dense layer of asymmetric membranes, for instance only at, or near, the surface of such layer. This advantageously provides significant enhancement of separation factor for certain gases while only minimally reducing permeability.

The membranes of this invention can comprise any polymeric material capable of forming ammonium salts. Polymers which are useful in the membranes of this invention include those polymers having phenyl rings. Such polymers with phenyl rings are amenable to processing to provide ammonium salts. For instance phenyl rings can be provided with alkyl groups such as benzylic carbon or with acyl groups such as acetyl groups. Such groups are readily halogenated, say with bromine. Such halogenated groups are readily reactive with ammonia or primary amines such as methylamine, ethylamine, propylamine, butylamine or aniline, and secondary amines such as dimethylamine, diethylamine, ethylmethylamine, morpholine and the like. The reaction with ammonia and primary amines generally can result in a cross-linked polymer. The cross-linkage between polymer chains having halogenated alkyl groups is usually benzylic amine bonding. The cross-linkage between polymer chains having haloacyl groups is usually amino ketone bonding. Such cross-link bonding is neutral amine bonding.

Preferred polymers include polysulfones, polyethersulfones and polyphenylene oxides. A preferred polyphenylene oxide is poly(2,6-dimethyl-1,4-phenylene oxide) and such polymer with 3 or 5 position substituents selected from the group consisting of hydrogen, aliphatic hydrocarbon radicals containing 1 to 4 carbon atoms, halogen, nitro, sulfono and acyl radicals having at least two carbon atoms.

Ammonium salts bonded to the surface of the membrane can be represented by the structural formula

$-NHR_1R_2Y^-$, where $R_1$ and $R_2$ can be the same or different and are selected from the group consisting of hydrogen, a lower alkyl having from 1 to 6 carbon atoms and phenyl (it is understood that such alkyl or phenyl may be substituted for instance with a halogen, hydroxyl, nitro or other radical), or $R_1$ and $R_2$ are part of a cyclic ring, including a heterocyclic ring such as morpholene; and Y is an anion radical. Preferred anion radicals are selected from the group consisting of fluoro, chloro, bromo, iodo, acyl, cyano, perchloro, nitro, bicarbonate and sulfonato.

It is generally desirable to preform the polymer into a membrane form prior to reacting with ammonia or primary or secondary amine. Preferred membrane forms are asymmetric membranes in hollow fiber or film form. Preferred hollow fiber membranes may have pores in the dense layer.

When the membrane is reacted with ammonia or amine $R_1$ and $R_2$ will represent the radical in the cross-link bridge between the nitrogen and the phenyl ring of the polymer chain. In such case $R_1$ and $R_2$ will generally be the same and will be a lower alkyl or lower acyl of 1 to 4 carbon atoms.

The following examples illustrate aspects of the membrane of this invention.

EXAMPLE 1

This example illustrates a procedure for forming hollow fiber membranes useful in this invention.

Brominated polyarylene oxide was prepared from poly(2,6-dimethyl-1,4-phenylene oxide). The brominated polyarylene oxide had a bromine content of 33.4 percent by weight and had a benzylic bromine level of 0.56 bromine atoms per phenyl group and an aryl bromine level of 0.19 bromine atoms per phenyl group. A spinning solution was prepared and consisted of about 32 percent by weight of the brominated polymer and 68 percent by weight of a liquid carrier consisting of 78 percent by weight of N-formylpiperidine, 20 percent by weight acetic acid and 2 percent by weight acetic anhydride. The spinning solution was prepared by mixing to completely dissolve the brominated polymer. The brominated polymer solution was allowed to deaerate at room temperature.

The deaerated brominated polymer solution was heated to about 35° C. and pumped at a rate of about 5.9 cc/min to a tube-in-orifice-type spinnerette having an orifice diameter of 457 microns, an injection tube outside diameter of 127 microns and an injection tube inside diameter of 76 microns. The spinnerette was maintained at a temperature of approximately 35° C. by the use of an external electrical heating jacket. Deionized water at ambient temperatures was fed to the injection tube at a rate sufficient to maintain the hollow fiber shape, about 1.7 milliliters per minute. The nascent hollow fiber was extruded at a rate of about 19.8 meters per minute through an air gap into a coagulation bath containing running tap water. The coagulation bath was maintained at a temperature of about 10° C. The nascent hollow fiber passed vertically downward into the coagulation bath for a distance of about 17 centimeters, around a roller to a slightly upwardly slanted path through the coagulation bath and then exited from the coagulation bath. The distance of immersion in the coagulation bath was about 1 meter.

The hollow fiber from the coagulation bath was then washed with running tap water in three sequential baths having Godet rolls. In each bath, the hollow fiber was immersed for a distance of about 10 to 13 meters. The first bath was maintained at a temperature of about 20° C.; the second, 11° C.; and third, 20° C.

The hollow fiber, while being maintained wet with water, was wound on a bobbin using a Leesona winder. The bobbin was stored in a vessel containing running tap water for about 24 hours and then stored in tap water at about ambient temperature for about 4 to 5 days. The hollow fiber, while being maintained wet, was wound on a skeiner to form hanks of hollow fibers. The hanks of hollow fiber were hung vertically and are allowed to air dry at ambient temperature for about five days. The dried hollow fiber had an outside diameter of about 510 microns and an inner diameter of about 300 microns.

A test bundle of 6 to 8 hollow fiber membranes each of about 12 centimeters in length, was prepared. At one end, the test bundle was embedded in epoxy to form a cylindrical tube sheet through which the bores of the hollow fibers communicate. The other end was plugged with epoxy.

The permeabilities and separation factors of a test bundle of hollow fiber membranes were determined using gas mixtures in an elongated cylindrical chamber of about 150 cc. The gas mixtures were fed to the chamber to contact the outer surface of the hollow fiber membranes at pressures in a range of 170-790 KPa. The gas mixtures passed through the chamber at a flow rate in the range of one to six liters per minute. The bores of the hollow fibers were under vacuum for about 5 to 10 minutes until the permeation reached equilibrium. Permeabilities were determined by allowing permeate gas to expand into a calibrated volume over a period of time. The permeate gas samples were then subjected to analysis. The permeability, (P/l), is expressed in GPU, which is $10^{-6} cm^3(STP)/cm^2\text{-sec-cmHg}$.

The membranes exhibited a permeability for hydrogen, $(P/l)H_2$, of 328 GPU and a separation factor for hydrogen over methane, $\alpha H_2/CH_4$ of 6.0.

EXAMPLE 2

This example illustrates a procedure for coating bundles of hollow fiber membranes using a test bundle of hollow fiber membranes as prepared in Example 1.

While the bores of the hollow fibers in the test bundle were subjected to a vacuum (about 0.1 to 2 millimeters of mercury absolute pressure), the test bundle was dipped in a coating solution of about 1.0 percent by weight of room temperature-curable polydimethylsiloxane in n-pentane. Two 10-second dips were sufficient to effectively coat the fibers. Bore vacuum was maintained for about 10 to 15 minutes after the test bundle was removed from the coating solution. The test bundles were dried at ambient conditions for at least one day before the permeation properties of the test bundles were determined.

The permeation properties were determined as in Example 1. The polydimethylsiloxane coated membranes exhibited a permeability for hydrogen, $(P/l)H_2$, of 232 GPU; a separation factor for hydrogen over methane, $\alpha H_2/CH_4$, of 48; a permeability for carbon dioxide, $(P/l)CO_2$, of 91; and a separation factor for carbon dioxide over methane, $\alpha CO_2/CH_4$, of 19.

EXAMPLE 3

This example illustrates a procedure for cross-linking of membranes with ammonia. Such cross-linked membranes are useful in forming the membranes with ammonium salts of this invention.

A test bundle of hollow fiber membranes as prepared in Example 1 was cross-linked with a solution of ammonia. The membranes comprised brominated poly(2,6-dimethyl-1,4-phenylene oxide) having 0.56 benzylic bromine atoms per phenyl group and 0.19 aryl bromine atoms per phenyl group. The benzylic bromine atoms readily reacted with a cross-linking agent, such as ammonia to form a cross-linked polymeric membrane. The test bundle was immersed in a concentrated aqueous solution of ammonia at 23° C. for 16 hours and air dried. The resulting membranes were cross-linked and not soluble in solvents for the brominated polymer.

Permeation properties of the cross-linked membranes were determined as in Example 1. The membranes exhibited a permeability for hydrogen, $(P/l)H_2$, of 298 GPU and a separation factor for hydrogen over methane of 6.0.

EXAMPLE 4

This example illustrates the formation of ammonium salts on cross-linked membranes. This example also illustrates that permeability is substantially reduced with increased exposure to acid and that advantageous permeation properties, that is moderately reduced permeability and substantially increased separation factor, can be achieved with minimal exposure of the membrane to the salt-forming acid. Desirably such salt formation is essentially only at the thin layer of an asymmetric membrane, for instance at the surface of the thin layer.

Four test bundles of hollow fiber membranes cross-linked with ammonia as prepared in Example 3 were identified as test bundles 4A–4D. Each test bundle was exposed to a hydrohalide acid gas for a definite time to effect formation of ammonium salts on the membrane. The test bundles were coated according to the procedure of Example 3.

Test bundle 4A was exposed to a gas of 100 percent HCl for 10 minutes. Test bundle 4B was exposed to a gas of 100 percent HBr for 5 minutes. Test bundle 4C was exposed to a gas of 0.1 percent by volume HBr in nitrogen for 20 minutes. Test bundle 4D was exposed to a gas of 0.1 percent by volume HBr in nitrogen for 10 minutes.

The permeation properties of the test bundles are listed in Table I.

TABLE I

| Test Bundle | Permeation Properties | | | | | |
|---|---|---|---|---|---|---|
| | Untreated | | Hydrohalide Acid Gas Treated | | Treated and Coated | |
| | P/l | α | P/l | α | P/l | α |
| 4A | 177 | 19 | — | — | 41 | 140 |
| 4B | 278 | 7 | — | — | 18 | 194 |
| 4C | 298 | 6 | 96 | 23 | 71 | 95 |
| 4D | 358 | 6 | 140 | 8 | 78 | 92 |

P/l represents permeability for hydrogen in GPU
α represents separation factor for hydrogen over methane.

EXAMPLE 5

This example illustrates the formation of ammonium salts on dense film membranes of a polysulfone. Such membranes have an enhanced separation factor indicating that the invention can be utilized with a wide variety of polymers which can be provided with ammonium salts.

Poly(bis-ortho-cresol acetone phenyl sulfone ether) having the structural formula

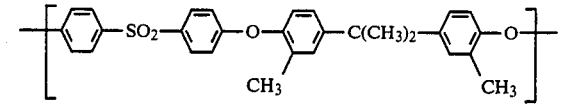

was halogenated at the benzylic position by adding bromine to a boiling solution of the polymer in chlorobenzene. Bromine was added at a 1:1 molar ratio of $Br_2$ per polymer unit. The resulting brominated polymer precursor had 0.79 benzylic bromine atoms per polymer unit. The brominated polymer precursor formed strong flexible films which could be blended with other polysulfone polymers. Such blended polymers generally formed clear solutions and transparent films indicating a degree of compatability.

Dense film membranes were cast from the brominated polymer precursor. Such membranes were cross-linked by soaking the membranes in a solution of concentrated ammonium hydroxide. Such cross-linked films are insoluble in solvents for the brominated polymer precursor.

The dense film membrane was dried and exposed for one day to anhydrous HBr at atmospheric pressure to form ammonium salts on the membrane. Excess HBr was removed by maintaining the membrane under a nitrogen sweep for four days at reduced pressure.

Permeation properties for the precursor membrane, the cross-linked membrane and the ammonium salt membrane are listed in Table II.

TABLE II

| Membrane | Intrinsic Permeabilities* | | |
|---|---|---|---|
| | $P_{H2}$ | $P_{CO2}$ | $CO_2$ |
| Precursor | 6.4 | 2.6 | 0.6 |
| Cross-linked | 6.9 | 1.6 | 0.4 |
| Ammonium Salt | 5.1 | 1.4 | 0.3 |

| Membrane | Separation Factors | | | |
|---|---|---|---|---|
| | α $H_2/CH_4$ | α $H_2/CO$ | α $CO_2/CH_4$ | α $O_2/N_2$ |
| Presursor | 70 | 40 | 29 | 6.5 |
| Cross-linked | 160 | 58 | 45 | 7.0 |
| Ammonium Salt | 220 | 59 | 54 | 7.4 |

*Intrinsic permeabilities are reported in units of $10^{-10}$ cc(STP) cm/cm$^2$-sec-cmHg.

The foregoing description of embodiments of this invention is not intended to be a limitation to the scope of this invention. As will be apparent to those skilled in the art, many variations and modifications can be made to the membranes and process of this invention as described in the above embodiments without departing from the spirit and scope of this invention.

I claim:

1. An asymetric polymeric gas separation membrane membrane in a hollow fiber form having a porous support and a thin dense layer, said membrane having ammonium salts bonded to phenylene oxide polymers of the porous support essentially at the layer of said membrane, wherein the ammonium salts enhance the separation factor of said membrane.

2. The membrane of claim 1 wherein said phenylene oxide polymer is cross-linked by neutral amine bonding.

3. The membrane of claim 2 wherein said neutral amine bonding comprises benzyl amine bonding.

4. The membrane of claim 2 wherein said neutral amine bonding comprises amino ketone bonding.

5. The membrane of claim 2 wherein said phenylene oxide polymer comprises poly(xylylene oxide).

6. An asymetric phenylene oxide polymeric gas separation membrane having a porous support and a thin dense layer, said membrane having ammonium salts bonded to the polymer essentially at the layer of said membranes; the ammonium salts having the structural formula:

$$N-HR_1,R_2Y,$$

wherein $R_1$ and $R_2$ are the same or different and are selected from the group consisting of hydrogen, lower alkyl groups or lower acyl groups having one (1) to four (4) carbons, wherein said groups are bonded to phenyl rings within said polymer and provide cross-linkage between polymer chains; and Y is an anion radical selected from the group consisting of fluoro, chloro, bromo, iodo, acyl, cyano, perchloro, bicarbonate, nitro and sulfono.

* * * * *